March 13, 1945.   J. W. FAY ET AL   2,371,234
RETAINING MEANS
Filed Nov. 12, 1943
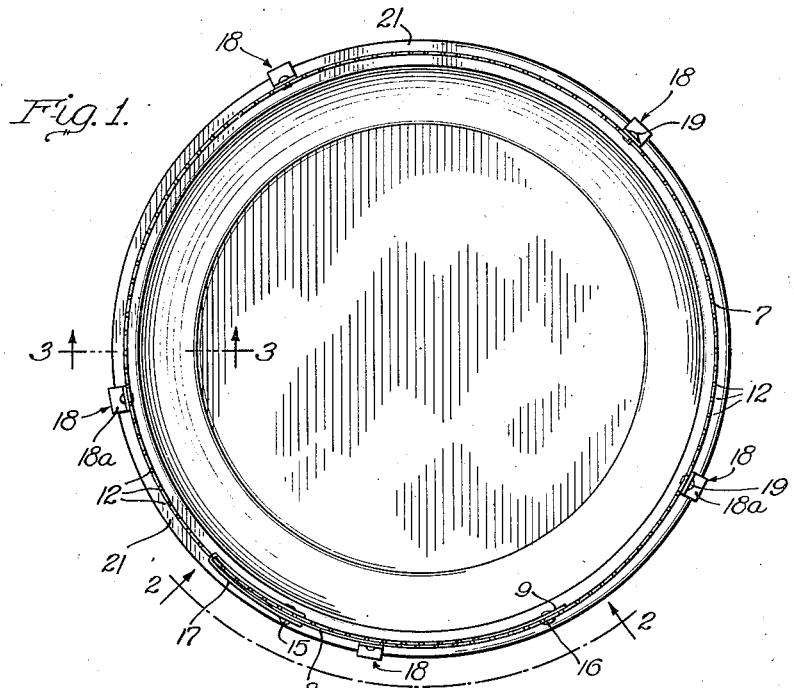
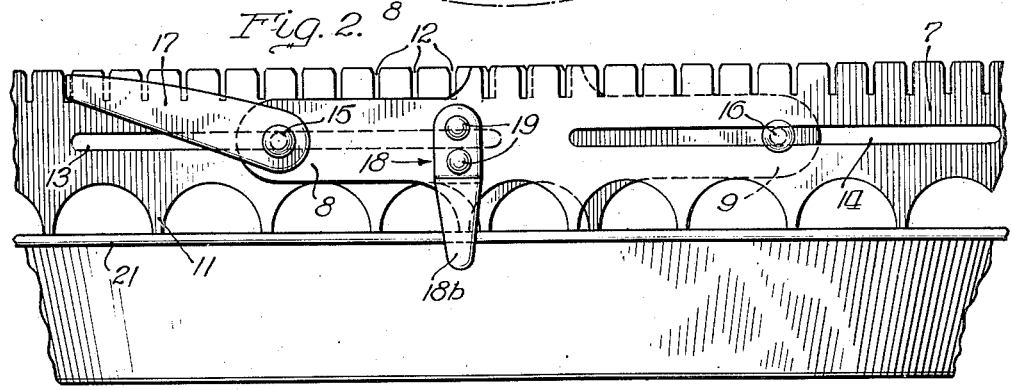
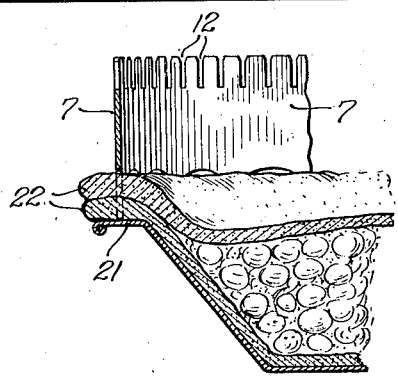
INVENTORS
Joseph W. Fay
and Rudolph Fay
BY
Attys.

Patented Mar. 13, 1945

2,371,234

UNITED STATES PATENT OFFICE 2,371,234

RETAINING MEANS

Joseph W. Fay and Rudolph Fay, Villa Park, Ill.;
said Rudolph Fay assignor to said Joseph W.
Fay Application November 12, 1943, Serial No. 509,987

8 Claims. (Cl. 99—433)

This invention relates to retaining means, and is more particularly concerned with an annular retaining member intended for employment with a pie tin in a manner and for a purpose hereinafter described.

In preparing pies for the oven it is customary to employ a relatively shallow pan or tin provided with an outwardly extending annular flange disposed at right angles to the side wall of the tin. This tin is well greased and a pancake like disc of dough placed therein and shaped by the fingers to the contour of the tin and with the dough overlying the annular flange. The excess of dough is removed by running a knife around the outer edge of the flange. The pie filling is then poured into the dough in the tin. If the pie is to be an open faced one, it is now placed in the oven for baking. However, if the pie is to be what may be termed a closed face pie, a second disc of dough is placed over the filling and seats on the first layer of dough on the flange. The excess of the second layer of dough is removed as before described. The pie is now ready for baking.

It has been observed that certain phenomena occur during baking of the pie which has undesirable results. That is, there appears to be a tendency for the lower layer of dough to draw away from the edge of the flange and contract into the tin during baking with the result that the filling overflows onto the flange, from which it either runs off the flange into the oven, or it seeps down between the dough and the pie tin. This is especially true with the closed faced pie as the steam entrapped between the two layers of dough appears to forcibly eject the filling therefrom. In the one case the result is a messy condition in the oven, while in the other case, the filling appears to absorb or cook out the grease between the pan and the dough with the result that the dough sticks to the pan and requires forcible removal therefrom, which too frequently results in the necessity of breaking up of the pie to remove it from the tin.

In its broader aspects, the present invention contemplates a form of device of a character that will effectively eliminate the conditions above described.

Specifically, the present invention contemplates the provision of retaining means in the form of an annular member or ring of spring metal, one circumferential edge of which is serrated to provide tapered prongs adapted to seat on the flange of the pie tin. The ring is adjustable for different sizes of tins, and the edge of the ring opposite the serrated edges is slotted at predetermined points along its length both for an ornamental effect and for cooperation with a latch member that holds the ring in adjusted position on the tin. Means is provided to restrain radial relative movement between the ring and tin. In use, the ring is adjusted for the size of the tin and the prongs are forced through the layer or layers of dough on the tin flange and into contact with the flange. This, in effect, stakes the dough to the flange and restrains contraction of the dough into the pan during baking. Moreover, where it is employed with a closed faced pie, the ring effectively stakes the two layers of dough together and prevents bubbling of the filling outwardly from between such layers. In either case, the objectionable conditions above described are eliminated.

Other features and advantages of the invention will appear from the following detailed description when taken in connection with the accompanying drawing, in which the preferred illustrative embodiment of our invention is shown, and in which:

Figure 1 is a plan view of a retaining member embodying the principles of the present invention;

Figure 2 is a fragmentary elevational view of the device of Figure 1, taken substantially along the plane of line 2—2 of Figure 1; and Figure 3 is a fragmentary vertical sectional view taken substantially along the plane of line 3—3 of Figure 1.

Referring now in detail to the drawing, the retaining means of the present invention comprises a strap 7 conveniently formed from a single length of spring metal of relatively little thickness but of appreciable width. The length of the strap will, of course, be such that it may be made adjustable for different sizes of pie tins in the manner hereinafter described. The opposite ends of the strap are reduced in width to provide the outwardly extending tongues 8, 9 and one longitudinal edge of the strap has semi-circular portions of the metal removed therefrom at measured points throughout its length to form the tapered prongs 11, while the opposite longitudinal edge of the strap has the transversely extending slots 12 cut therein, also at measured points through its length. These slots and prongs may conveniently be formed on and in the strap by a single stamping operation, as may the longitudinally extending slots 13—14 located adjacent the opposite ends of the strap, immediately in rear of tongues 8, 9 and extending longitudinally of the strap for an appreciable distance.

Strap 7, modified as above, is then bent to annular form with the tongues thereof disposed in overlapping relationship. The strap is maintained in such form by the headed pins 15—16. Such pins pass through suitable openings located adjacent the free ends of tongues 8, 9, pin 15 additionally passing through slot 13, while pin 16 passes through slot 14. These pins have sliding movement in their cooperating slot so that the diameter of the ring may be changed as desired by relative sliding movement between the slots and pins.

The ring is held in adjusted position within limits of the slots 13—14 by a latch member 17, which comprises a bail having its legs straddling the ends of the strap and pivotally secured to the pin 15. The bail is adapted to swing into and out of slots 12, it being apparent that engagement of the bail in one of the slots will maintain the ring in a desired adjusted position. It will, of course, be apparent that the latch member may widely be varied in form. For example, bail 17 could be dispensed with and a thumb screw substituted for pin 15, the screw passing through the opening for pin 15 and through slot 13, the ends of the strap being then frictionally held together under pressure of such screw.

Depending fingers 18 are secured to the outer surface of the ring as by the rivets 19. There may be any number of these fingers, but the five shown are usually sufficient. As shown, the fingers have an outwardly extending horizontal portion 18a from which depends the vertical portion 18b, which in the adjusted position of the ring on the tin contacts the marginal edge of the tin-flange 21, thereby to restrain relative radial movement between the ring and the tin when the ring is in place thereon. By proper proportioning of finger portion 18a in conjunction with proper spacing of slots 12, the prongs 11 will be disposed at approximately the center line of the tin-flange 21. It is also to be noted that portion 18a of finger 18 is so positioned as to clear the two layers of dough 22 which is adapted to seat on flange 21.

In use of the device, after the dough and filling has been placed in the tin, the ring, adjusted to the size of the tin, is placed thereon and the prongs 11 pressed down through the dough 22, whether one or two layers, into contact with the flange 21. As there can be no relative movement between the ring and tin, this will effectively stake the dough to the tin-flange, and the prongs of the ring will effectively restrain contraction of the dough away from the flange into the tin, as well as to stake together two layers of dough, where such are employed.

While a preferred embodiment of the invention has been illustrated and described, by way of example, it will be obvious that changes may be made therein within the spirit and scope of the invention and, therefore, the invention is not to be limited to the precise form herein described, except in so far as it may so be limited by the appended claims.

We claim:

1. A retaining member, for use with pie tins and the like having an outwardly extending annular flange, comprising a strap bent to ring form, means securing said strap in said ring form, a plurality of prongs formed along one marginal edge of the strap and adapted to seat on said tin-flange, and means associated with said flange and ring to restrain relative radial movement between said tin and ring.

2. A retaining member, for use with pie tins and the like having an outwardly extending annular flange, comprising a strap bent to ring form, means retaining said strap in ring form and providing for adjustment thereof to fit different sizes of tins, latch means securing said ring in adjusted position, a plurality of prongs formed on one marginal edge of said ring and adapted to seat on said tin-flange approximately mid-way between the transverse edges thereof, and fingers secured to said ring and extending outwardly and downwardly therefrom for engagement with the outer edge of said flange thereby to restrain radial movement between the ring and tin.

3. A retaining member, for use with pie tins and the like having an outwardly extending annular flange, comprising a strap bent to ring form, cooperating slot and pin connections retaining said strap in ring form and providing for adjustment thereof to fit different sizes of tins, latch means securing said ring in adjusted position, a plurality of prongs formed along one edge of said ring and adapted to seat on said tin-flange, and means carried by said ring and engaging said flange to restrain radial movement between the ring and tin.

4. A retaining member, for use with pie tins and the like having an outwardly extending annular flange, comprising a strap bent to ring form, cooperating slot and pin connections retaining said strap in ring form and providing for adjustment thereof to fit different sizes of tins, a series of transverse slots formed along one edge of said ring, a bail pivoted to one end of said strap and adapted for engagement in certain of said slots selectively to maintain said ring in adjusted position, a plurality of tapered prongs formed along the opposite edge of said ring and adapted to seat on said tin-flange, and means cooperating between the flange and ring to restrain radial movement between the ring and tin.

5. A retaining member, for use with pie tins and the like having an outwardly extending annular flange, comprising a strap bent to ring form, a pair of pin and slot connections retaining said strap in ring form and providing for adjustment thereof to fit different sizes of tins, a series of transverse slots along one edge of said ring, a bail pivoted to one of said aforementioned pins and adapted for selective engagement in certain of said slots to maintain said ring in adjusted position, a plurality of prongs formed on the opposite marginal edge of said ring and adapted to seat on said tin-flange, and means cooperating between the flange and ring to restrain radial movement between the tin and ring.

6. A retaining member for use with a pie pan or the like having an outwardly extending annular flange over which the dough for forming the crust of the pie is adapted to be disposed, said retaining member comprising an open ring of a size and shape to conform to the outwardly extending flange of the pan, and a plurality of spaced and relatively small prongs along the lower edge of the ring and adapted to be inserted into the crust and to seat on the flange of the pan, the lower marginal portion of the ring having openings between said prongs through which the heat is adapted to pass when the ring is in place to assure baking of the edge of the pie.

7. A retaining member for use with a pie pan or the like having an outwardly extending annular flange over which the dough for forming the crust of the pie is adapted to be disposed, said retaining member comprising an open ring of a size and shape to conform to the outwardly extending flange of the pan, a plurality of spaced and relatively small prongs along the lower edge of the ring and adapted to be inserted into the crust and to seat on the flange of the pan, the lower marginal portion of the ring having openings between said prongs through which the heat is adapted to pass when the ring is in place to assure baking of the edge of the pie, and circumferentially spaced means on said ring for cooperation with the pan to hold the ring against lateral displacement from the pan.

8. A retaining member for use with a pie pan or the like having an outwardly extending annular flange over which the dough for forming the crust of the pie is adapted to be disposed, said retaining member comprising an open ring of a size and shape to conform to the outwardly extending flange of the pan, a plurality of spaced and relatively small prongs along the lower edge of the ring and adapted to be inserted into the crust and to seat on the flange of the pan, the lower marginal portion of the ring having openings between said prongs through which the heat is adapted to pass when the ring is in place to assure baking of the edge of the pie, and means for adjusting said ring for different sizes of pans.

JOSEPH W. FAY.
RUDOLPH FAY.